United States Patent Office 3,053,802
Patented Sept. 11, 1962

3,053,802
STABILIZED VINYL COMPOSITIONS
Anthony N. Piacente, Rutherford, N.J., assignor to Congoleum-Nairn Inc., Kearny, N.J., a corporation of New York
No Drawing. Filed Feb. 29, 1960, Ser. No. 11,408
6 Claims. (Cl. 260—45.7)

This invention relates to polyvinyl halide compositions and particularly to such compositions having improved stability to light and heat.

Polyvinyl halide compositions contain, in addition to the vinyl halide resin, filler, pigments, plasticizers, resin extenders and the like. These compositions have found many useful applications because of their extraordinary resistance to oxidation, organic solvents, acids, alkalis and similar deteriorating influences. In addition, because of their high wear resistance, they are particularly useful in the production of surface coverings such as floor tile and counter tops. In the manufacture of such products, it is necessary to subject the compositions containing the polyvinyl halide resins to elevated temperatures. At such high temperatures, these polymeric substances have marked tendencies to split off hydrogen halide. The liberated hydrogen halide attacks the pigmentation of the composition causing discoloration. The greater the liberation of hydrogen halide, the more discoloration.

Light has a similar effect on the polymeric compositions in that long exposure to light can cause extensive discoloration due to hydrogen halide liberation. The deteriorating effects of such liberation is particularly evident in compositions containing asbestos as a filler. In producing so-called vinyl asbestos tile, the asbestos is present in from about 5 to about 35% by weight of the composition. The impurities in the asbestos, particularly iron, appear to catalyze the liberation of hydrogen halide. Stabilizing components are added for the purpose of neutralizing the liberated hydrogen halide and thereby preventing this deteriorating effect. The addition of boric acid in small quantities is known to improve the heat stability of polyvinyl halide compositions, but such addition has little effect on light stability of the compositions.

An object of the invention is to provide stable polyvinyl halide compositions. Another object of the invention is to provide a composite stabilizer which, upon the addition to polyvinyl halide compositions, will prevent deterioration due to light and heat. Other objects and the advantages of the invention will appear hereinafter.

In accordance with the invention, stable polyvinyl halide compositions are prepared by adding to such compositions a composite stabilizer comprising a mixture of barium hydroxide and boric acid. The ability of barium hydroxide to improve the stabilizing effect of boric acid is quite surprising since barium hydroxide alone has a deteriorating effect on both the heat and light stability of polyvinyl halide compositions.

In order to obtain desired heat stability of polyvinyl halide compositions, it is necessary to add at least 3% of boric acid based on the weight of the polyvinyl halide resin to the composition. The barium hydroxide is added in from about 1 to about 3%. The maximum amount of boric acid present is not critical, but the maximum result is obtained with not over 10%. The effectiveness of the composite stabilizer is limited to the narrow range of barium hydroxide. When amounts greater than 3% are used, the heat stability of the composition rapidly decreases.

The composite stabilizer of the invention has its greatest utility in polyvinyl halide compositions, although it is usually effective in any vinyl composition which liberates hydrogen halide on exposure to light and/or heat. Typical of other such compositions are those containing polymers and copolymers of vinyl bromide and vinyl fluoride; chlororubber, chlorinated butadiene rubber, chloropolyvinyl chloride, trichloroethylene, and interpolymerization products of these monomeric compounds either with one another or other polymerizable substances. Such compositions in addition to the resin components usually contain plasticizers, fillers, softeners and the like.

The synergistic effect of the composite stabilizer of the invention is seen by reference to Table A wherein various amounts of the composite stabilizer were added to the following compositions:

|  | Parts |
|---|---|
| Polyvinyl chloride | 100 |
| Limestone | 500 |
| Asbestos | 100 |
| Plasticizer (propylene-glycol dibenzoate) | 46 |
| Whiting | 18 |

Portions of the composition after mixing were subjected to heat of the order of 275° F. for a period of one hour by milling between two heated rolls. The light stability was determined by exposing sheets of the composition to a twin carbon arc light source for ninety-six hours in a chamber having air temperature of about 120° F.

Table A

| Example | Barium Hydroxide | Boric Acid | Light Stability | Heat Stability |
|---|---|---|---|---|
| 1 | 0 | 0 | 6 | 13 |
| 2 | 1.2 | 0 | 8 | 16 |
| 3 | 2.4 | 0 | 6 | 14 |
| 4 | 3.6 | 0 | 7 | 15 |
| 5 | 4.8 | 0 | 8 | 17 |
| 6 | 0 | 1.2 | 6 | 10 |
| 7 | 0 | 2.4 | 6 | 3 |
| 8 | 0 | 3.6 | 5 | 1 |
| 9 | 0 | 4.8 | 4 | 6 |
| 10 | 1.2 | 1.2 | 5 | 8 |
| 11 | 1.2 | 2.4 | 4 | 7 |
| 12 | 1.2 | 3.6 | 4 | 5 |
| 13 | 1.2 | 4.8 | 3 | 2 |
| 14 | 2.4 | 1.2 | 5 | 11 |
| 15 | 3.6 | 1.2 | 4 | 15 |
| 16 | 4.8 | 1.2 | 3 | 16 |
| 17 | 2.4 | 4.8 | 2 | 4 |
| 18 | 4.8 | 2.4 | 1 | 9 |
| 19 | 4.8 | 4.8 | 1 | 12 |

The light stability and heat stability were determined by arbitrarily assigning numbers to the various samples, the lower numbers having the greatest stability. As can be seen by reference to the table, samples 12, 13 and 17 have unusually superior properties as compared with all the other samples.

Any departure from the foregoing description which conforms to the invention is intended to be included within the scope of the claims.

What is claimed is:

1. A polyvinyl halide composition stabilized against deterioration by light and heat comprising a polyvinyl halide resin and a composite stabilizer which comprises a mixture of about 1 to about 3% barium hydroxide and at least 3% boric acid.

2. A polyvinyl chloride composition stabilized against deterioration by light and heat comprising a polyvinyl chloride resin and a composite stabilizer which comprises a mixture of about 1 to about 3% barium hydroxide and at least 3% boric acid.

3. A polyvinyl chloride composition stabilized against deterioration by light and heat comprising a polyvinyl chloride resin and a composite stabilizer which comprises a mixture of about 1 to about 3% barium hydroxide and about 3 to about 10% boric acid.

4. A polyvinyl chloride composition stabilized against deterioration by light and heat comprising a polyvinyl chloride resin, plasticizer for said resin, asbestos and a composite stabilizer which comprises a mixture of about 1 to about 3% barium hydroxide and about 3 to about 10% boric acid.

5. In a method for producing a polyvinyl halide composition which comprises mixing polyvinyl halide resin, plasticizer and fillers under heat to form a homogeneous fused composition and thereafter forming the fused composition into a designated shape, the improvement which comprises adding to the composition prior to forming said homogeneous fused composition to prevent deterioration of said resin by light and heat, a composite stabilizer comprising a mixture of about 1 to about 3 percent by weight based on the weight of the resin of barium hydroxide and at least 3 percent boric acid.

6. In a method for producing a polyvinyl chloride composition which comprises mixing polyvinyl chloride resin, plasticizer and fillers under heat to form a homogeneous fused composition and thereafter forming the fused composition into a designated shape, the improvement which comprises adding to the composition prior to forming said homogeneous fused composition to prevent deterioration of said resin by light and heat, a composite stabilizer comprising a mixture of about 1 to about 3 percent by weight based on the weight of the resin of barium hydroxide and at least 3 percent by weight of boric acid.

References Cited in the file of this patent

UNITED STATES PATENTS

| | | |
|---|---|---|
| 2,507,143 | Chaban | May 9, 1950 |
| 2,556,953 | Young | June 12, 1951 |
| 2,818,344 | Buckman | Dec. 31, 1957 |